Patented Sept. 21, 1954

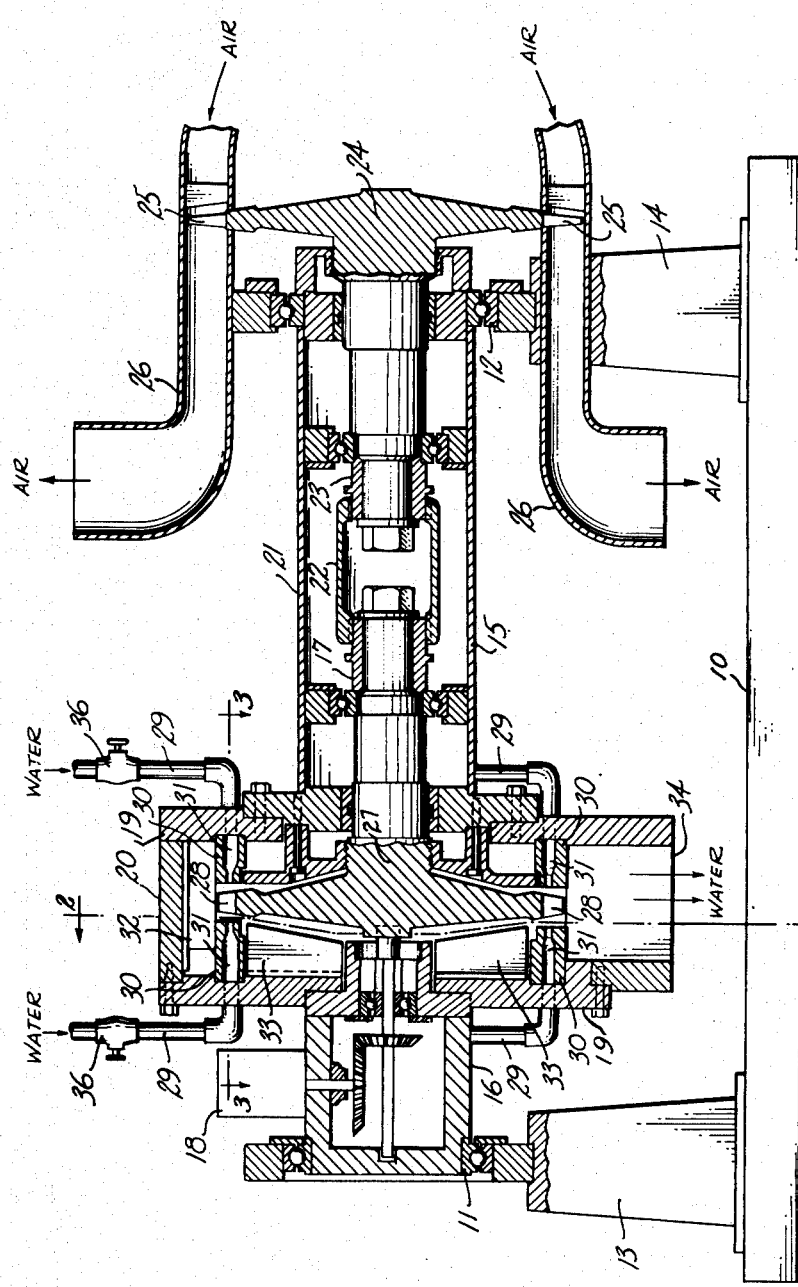

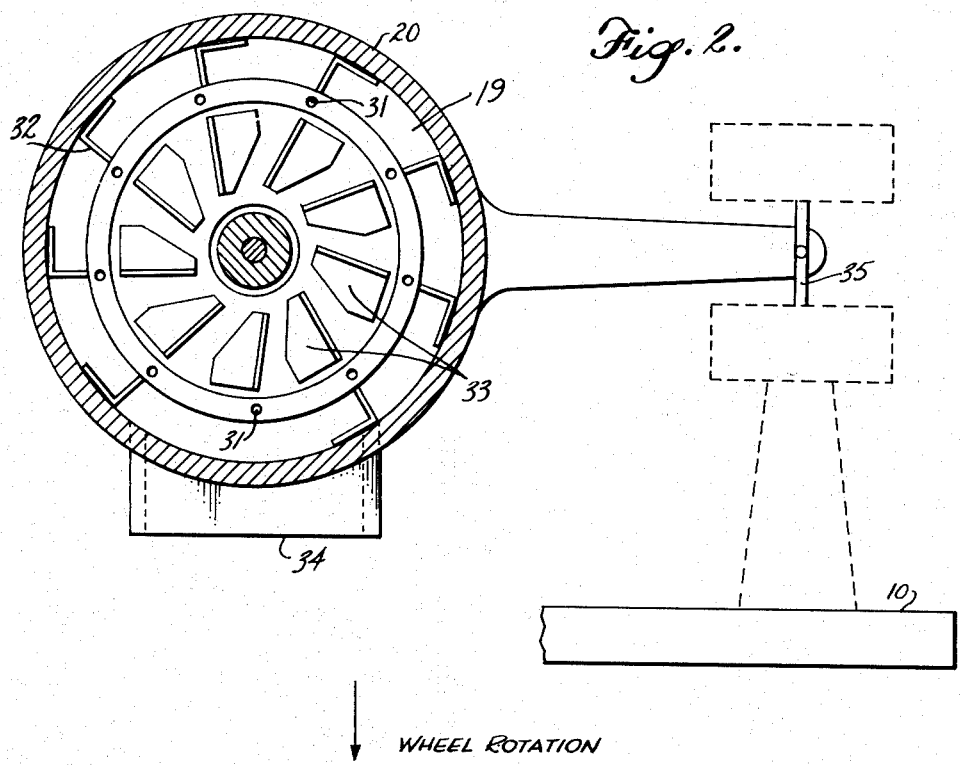
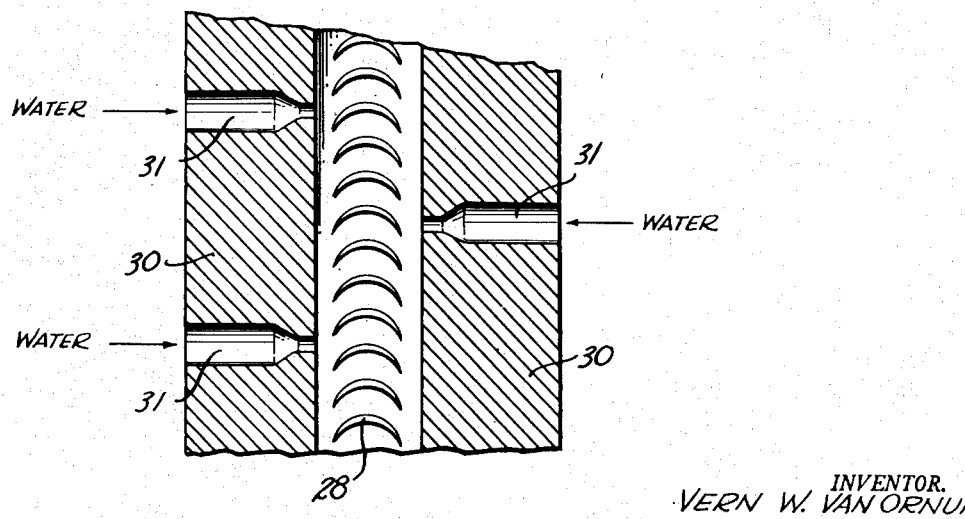

2,689,476

UNITED STATES PATENT OFFICE 2,689,476

FLUID DYNAMOMETER

Vern W. Van Ornum, Bellevue, Wash., assignor to Boeing Airplane Company, a corporation of Delaware Application June 23, 1952, Serial No. 294,987

1 Claim. (Cl. 73—134)

This invention relates to dynamometers and more particularly to a high speed fluid dynamometer.

The invention is an absorption fluid dynamometer for attachment to a driven test mechanism, the dynamometer comprising a base, a shaft rotatably supported by the base on bearings, a bladed wheel mounted on the shaft, bearings on the shaft, a housing surrounding the wheel and supported by the shaft on the bearings, removable nozzle rings in the interior sides of the said housing opposite the blade movement path, nozzles in the said rings to direct fluid into the bladed wheel, stator blades integral with one interior side of the said housing to receive the impact force of the fluid leaving the bladed wheel, fluid supply and discharge means and energy evaluation means including a tachometer to indicate shaft speed and a torque measurement device interconnected between the said housing and the base.

The dynamometer of this basic design is employed during the test runs of turbines and turbine wheels revolving at speeds as fast as 36,000 R. P. M. The braking action developed is described as being substantially equivalent to that developed by a turbine fluid pump with a set of 100% inefficient stator blades.

This use and other possible applications of the dynamometer will become apparent from the following description written with reference to the accompanying drawings, in which:

Figure 1 is a vertical sectional view of the dynamometer attached to a test mechanism.

Figure 2 is a sectional view of Figure 1 on line 2—2, including the torque measurement device, and Figure 3 is a sectional view of Figure 1 on line 3—3.

Referring to Figure 1, the base 10 supports the entire assembly on the bearings 11 and 12 secured to the base pedestals 13 and 14.

The housing 15 of the entire assembly is directly supported on the bearings 11 and 12. It is composed of several integrated sections of various diameters. At one end is the section 16 directly supported by the bearing 11 and containing the bearings, gears, etc., for connecting the dynamometer shaft 17 to the tachometer 18 for indicating its rotative speed. The adjacent attached housing section 19 supports portions of the dynamometer 20. The remaining housing section 21, attached to the section 19, is directly supported by the bearing 12 and internally supports the dynamometer shaft 17, the shaft coupling 22 and the test mechanism shaft 23.

Fitted to the test mechanism shaft 23 is a turbine wheel 24 with its blades 25 penetrating the interior of compressed air ducts 26 which are supported independently of the entire assembly by a means (not shown) attaching the ducts to the structure of the building in which the test equipment is installed.

The air at a substantial velocity revolves the wheel 24, undergoing the test, thereby rotating the respective shafts 17 and 23 and driving the dynamometer wheel 27.

This dynamometer wheel 27 is similar to the turbine wheel 24, however, the blades are less extensive in their area approximating only the root station surface of the regular blades 25 of the wheel 27 which is undergoing the test. The blades 28 are made of a Stellite material to withstand the effects of the extreme velocities and pressures involved.

The free rotation of this dynamometer wheel 27 and its surrounding movable assembly is restricted by injecting fluid into the revolving blades 28 of the wheel 27. The fluid is conveyed to the exterior of the housing section 19 through the pipes 29. It is directed through the nozzle rings 30 and nozzles 31 into the path of the blades 28 without acquiring any radial component of velocity.

As shown in Figure 3, the blades 28 are cup-shaped in cross-section so the entering fluid will be retained within the confines of the blade for a sufficient time to absorb some of the energy of the wheel 27. As the fluid leaves the wheel 27 with a velocity closely approaching twice the speed of the blades on the rotating wheel 27, its kinetic energy is substantially absorbed upon its impact with the stator blades 32, 33 made of Stellite material and firmly attached to the housing section 19. Thereafter the fluid is cleared from the housing section 19 through the drainage exit 34.

The impact force of the ejected fluid hitting the stator blades 32 produces a torque on the housing section 19 which is transmitted to the entire housing 15. The rotary deflection of the housing 15, that simultaneously occurs about its rotatable mounting on the bearings 11 and 12, is countered and measured by a conventional torque measurement device 35, indicated in Figure 2. This measurement coupled with instantaneous tachometer readings facilitates the determination of the effective loading on the turbine wheel 24 as produced by the fluid-dynamometer 20.

The control of the quantity of fluid by valves 36 directly regulates the dynamometer loading. To maintain effective injection of the various quantities of fluid into the blade paths as the range of speeds is varied and/or the size of the wheels or test mechanism is altered, nozzle rings 30 of variable design are interchanged within the housing section 19. The number and size of the nozzle openings are changed making each removably-insertable-nozzle ring suitable for the test of specific equipment such as a complete turbine, or the turbine wheel itself or some other rotatable member.

The embodiment as shown enables test personnel to derive accurate results and conclusions without needless calibrations that might otherwise be necessary if the housing failed to be inclusive of the entire rotating assembly. If it were not all inclusive, then recognition of the variances in the frictional loadings of the shafts and bearings unsupported by the housing would be in order to properly analyze the readings of the torque measurement device.

The design with limited modifications is adaptable to handling either air or water as the energy absorbing fluid. The use of water absorbs the most energy and generally is more satisfactory where large horsepowers are involved. Whereas, air is more satisfactoy where lower horsepowers and higher velocities are involved.

These modifications and others could be made without departing from the invention which effectually utilizes fluids as a braking medium in conjunction with a driven bladed wheel acting as a turbine fluid pump with a set of 100% inefficient stator blades of a cup-like cross-section as shown in Figure 3.

Having now particularly described and ascertained the nature of my invention and in what manner the same is to be performed, I declare that what I claim is:

A fluid dynamometer for absorption and determination of the energy developed during a high speed rotary test of equipment such as turbine wheels, comprising a base structure; a housing rotatably supported on the base structure; a shaft in sections coupled together and rotatably supported within the said housing; an attachment means on one section of the shaft to receive equipment for testing; a dynamometer wheel mounted on the other section of the shaft; arcuate cup-like blades integral with the dynamometer wheel around its periphery; nozzle rings removably inserted within the housing directly opposite the blades of the wheel; nozzles circumferentially spaced in the rings for direct injection of fluid into the blades without imparting any preliminary tangential component of velocity to the fluid; peripheral stator blades on the interior of the housing to receive the fluid departing from the peripheral blade tips; side stator blades on the interior of the housing to receive the limited fluid that is discharged from the disc portion of the dynamometer wheel; a fluid; a fluid supply means attached to the housing; and an absorbed energy evaluation means including a tachometer mounted on the housing and connected to the shaft and a torque measurement device interconnected between the housing and the base.

References Cited in the file of this patent

UNITED STATES PATENTS

| Number | Name | Date |
|---|---|---|
| 1,161,116 | Ehrhart | Nov. 23, 1915 |
| 2,144,010 | Bennett | Jan. 17, 1939 |
| 2,218,463 | Bennett | Oct. 15, 1940 |
| 2,379,700 | Franck | July 3, 1945 |
| 2,425,171 | Bennett et al. | Aug. 5, 1947 |